United States Patent [19]

Browning

[11] Patent Number: 4,788,402

[45] Date of Patent: Nov. 29, 1988

[54] HIGH POWER EXTENDED ARC PLASMA SPRAY METHOD AND APPARATUS

[76] Inventor: James A. Browning, P.O. Box 6, Hanover, N.H. 03755

[21] Appl. No.: 24,485

[22] Filed: Mar. 11, 1987

[51] Int. Cl.⁴ .................. B23K 9/00

[52] U.S. Cl. .................. 219/76.16; 219/121.53; 219/121.47; 219/121.59; 427/34

[58] Field of Search .......... 219/121 PL, 76.15, 76.16, 219/74, 75, 121 PQ, 121 PP, 121 PS, 121 PY; 427/34; 313/231.31, 231.41, 231.51

[56] References Cited

U.S. PATENT DOCUMENTS

| | | | |
|---|---|---|---|
| 3,248,513 | 4/1966 | Sunnen | 219/76.16 |
| 3,676,638 | 7/1972 | Stand | 219/76.16 |
| 3,914,573 | 10/1975 | Muehlberger | 219/121 PL |
| 3,962,486 | 6/1976 | Gerek et al. | 219/121 PL |
| 4,095,081 | 6/1978 | Ashman | 219/76.16 |
| 4,370,538 | 1/1983 | Browning | 219/121 PL |

FOREIGN PATENT DOCUMENTS

| | | | |
|---|---|---|---|
| 1440974 | 6/1976 | United Kingdom | 219/76.16 |

*Primary Examiner*—M. H. Paschall

*Attorney, Agent, or Firm*—Sughrue, Mion, Zinn, Macpeak & Seas

[57] ABSTRACT

A high voltage, high current is applied between a cathode electrode and a conductive body forming a spray nozzle and acting as a second anode electrode aligned with the first electrode and being spaced therefrom. A vortex flow of plasma-producing gas is established within a cylindrical body carrying said electrode to create a low pressure core of gas flow extending through the anode passage to establish an extended ionized arc column throughout the anode passage with the rate of gas flow adjusted and the arc current correlated to the anode nozzle passage diameter to produce a supersonic extended ionized arc column which extends beyond the end of the nozzle by a distance which is approximately four times the nozzle passage diameter. Preferably the material to be sprayed is introduced into the extended ionized arc column beyond the end of the nozzle to maximize the spray rate without undesirably overheating the spray material.

10 Claims, 2 Drawing Sheets

FIG.1 PRIOR ART
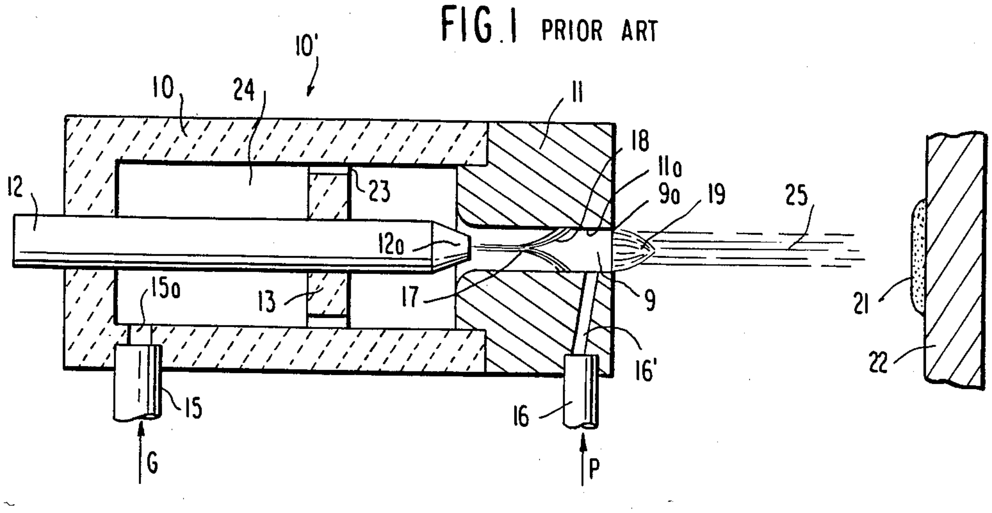
FIG.2a
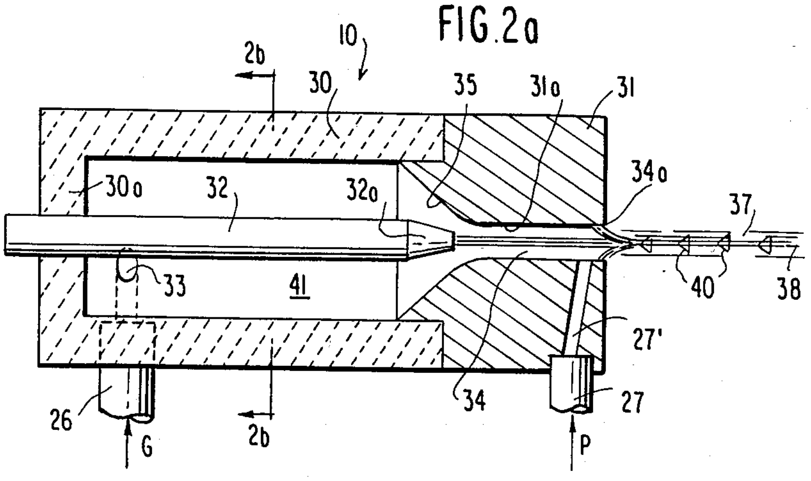
FIG.2b
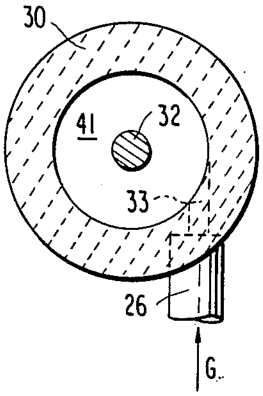
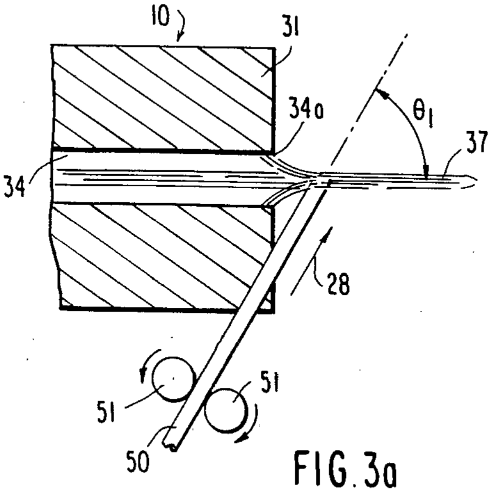
FIG.3a
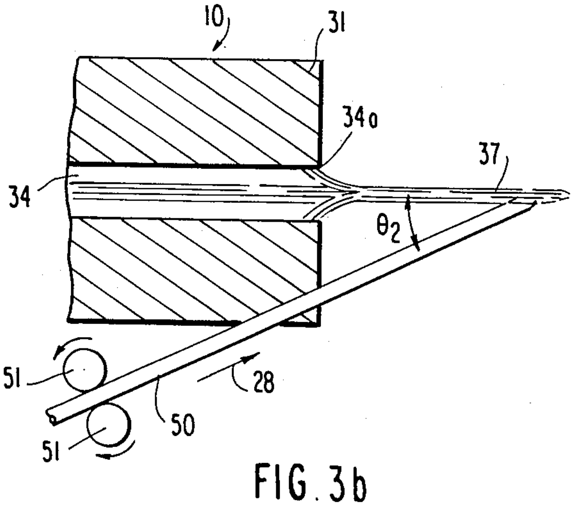
FIG.3b

HIGH POWER EXTENDED ARC PLASMA SPRAY METHOD AND APPARATUS

This invention relates to an improved plasma arc spray method and apparatus characterized by operation at significantly higher current and voltage over conventional plasma spray system with quadruple jet velocity and a significantly extended exterior arc for facilitating the heating of powder spray particles irrespective of significantly less dwell time of the particles within the extended arc plasma jet.

BACKGROUND OF THE INVENTION

Since the advent of plasma spraying of metals and ceramics to form coatings on surfaces in the 1950s, the plasma spraying process has become very important commercially. Surprisingly, the apparatus used (the basic art geometry) has essentially remained the same.

Referring to FIG. 1, a conventional plasma spray torch 10' is illustrated. To simplify the disclosure, the water cooling means have purposely been eliminated from that figure. An electrically insulating body piece 10 of cylindrical, cup-shape form supports a cathode electrode 12 coaxially and projecting towards but spaced from a second body piece 11 closing off the interior of the electrically insulating body piece 10 at the end opposite that supporting the cathode electrode 12. The second body piece 11 is provided with an axial a bore 11a constituting the plasma spray torch nozzle passage 9. An arc 17 is formed by connecting an electrical potential difference across the cathode electrode 12 and the second body piece 11, acting as the anode. The arc 17 passes from the electrode 12 to the inner wall of the nozzle passage 9. Its length is extended by a flow of plasma-forming gas as shown by the arrow G which enters the annular manifold 24 about the cathode electrode 12 through a gas supply tube 15. Tube 15 connects to the body piece 10 and through an aligned radial hole **15*a* within the side of that cylindrical body piece. A transverse partition 13 of insulating material, like that of body piece 10, supports the electrode 12. The partition 13 is provided with a number of small diameter passages 23 leading into the nozzle passage 9 with flow about the tapered tip end 12*a* of the electrode 12. Powder to be sprayed as indicated by the arrow P, passes into the arc-heated gases at a point beyond the anode foot 18 of arc 17. Powder is introduced through the tube 16 and flows into a passage 16' aligned therewith and opening to the bore 11*a* in such a manner as to assure centering of the powder flow as best possible along the hot gas jet 25 which exits from the end of the nozzle 9**.

An extremely bright conical arc region 19 extends a short distance beyond the exit of nozzle 9 with this region constituting the further extension of the ionized gas species. Tremendous heat transfer rates occur within the conical region 19. As may be appreciated, there is added gaseous heating of particle P flow beyond the ionized zone 19 within the hot gas jet 25. Further the particles pick up speed in the high velocity (but subsonic) jet 25 to strike the surface of the workpiece 22 and to form the coating 21 thereon.

Exemplary, the conventional plasma spray torch 10' is provided with a flow of 100 SCFH of nitrogen gas G using a nozzle passage 9 bore diameter of 5/16th of an inch, and the torch is provided with an operating current of 750 amp and an arc voltage of 80 volts. The ionized zone or region 19 is observed to extend about ⅓ of an inch beyond the end **9*a*** of the nozzle. The gross power level reached is 60 Kw. The combined cathode and anode losses are about 30 volts with a net heating capability ($I^2R$ heating of the gas) of 37.5 Kw. Assuming an additional heat loss to the cooling water of 20%, the gas heating amounts to 30 Kw. The enthalpy increase of the plasma gas in such conventional system under the conventional operating parameters set forth above is about 14,500 Btu per pound.

The Applicant has undertaken a detailed study of the beneficial effects of an extended high temperature supersonic flame cutting apparatus and method of rid transfer plasma arc torches, which study and results are exemplified by Applicant's recently issued U.S. Pat. No. 4,620,648 of Dec. 2, 1986. In conjunction with consideration of beneficial effects of extending the arc in nontransferred plasma arc torches, Applicant considered the utilization of a vortex flow of the plasma gas through the torch nozzle passage as facilitating the creation of an extended arc. In such considerations, the Applicant had full knowledge that in the past, vortex flow in nontransferred plasma-arc torches has led to a unreliable operation. Using subsonic jet velocities, the arc column bends back to strike the end face of the angled piece (such as the second body piece 11) in the conventional plasma arc spray torch 10' of FIG. 1 at points radially well removed from the nozzle **9*a*** exit. Rapid torch erosion results.

In spite of this knowledge, applicant sought an improved, high voltage, high current extended ionized arc column nontransferred plasma arc torch that could be employed to direct particles at supersonic jet velocity with a short dwell time against a substrate to be coated with adequate melting of the particles ensured and without torch erosion.

BRIEF DESCRIPTION OF THE FIGURES

FIG. 1 is a longitudinal sectional view of a conventional plasma spray torch employed in spray coating of a substrate.

FIG. **2*a*** is a longitudinal sectional view of the improved, nontransferred plasma arc torch forming a preferred embodiment of the present invention.

FIG. **2*b* is a transverse sectional view of the torch of FIG. 2*a* taken about line 2*b*—2*b***.

FIG. **3*a* is a longitudinal sectional view of a portion of the improved nontransferred plasma-arc torch of FIG. 2*a*** in which the material to be flame sprayed is fed in rod form into the extended length arc column.

FIG. **3*b* is a longitudinal sectional view of a portion of the apparatus of FIG. 2*a***, modified to feed the material to be flame sprayed in rod form at a substantially smaller acute angle to the axis of the extended arc column thereof.

Figure 4:
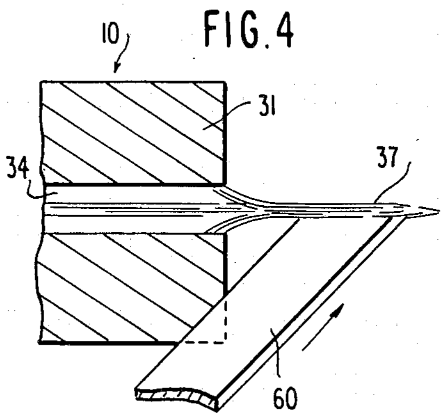

FIG. 4 is a partial sectional, partial perspective view of the apparatus of FIG. **2*a*** in which the material to be flame sprayed is fed into the extended arc column as a relatively thin, flat strip.

Figure 5:
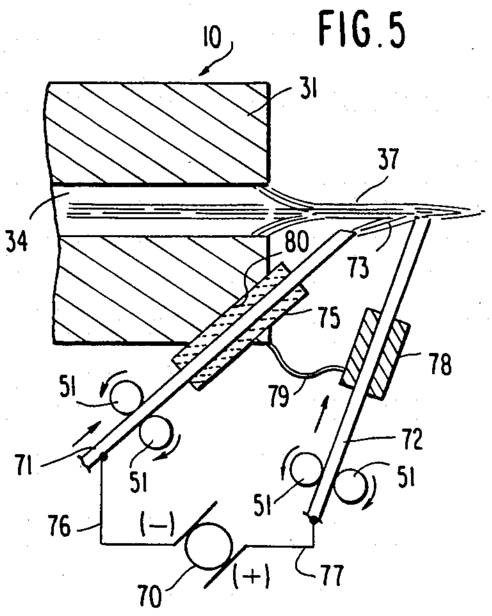

FIG. 5 is a longitudinal sectional view of a portion of the apparatus of FIG. **2*a*** utilizing two separate material feeds for the material to be flame sprayed in rod form and supplied to the extended arc columns at different angles and impinging the column at longitudinally spaced positions.

Figure 6:
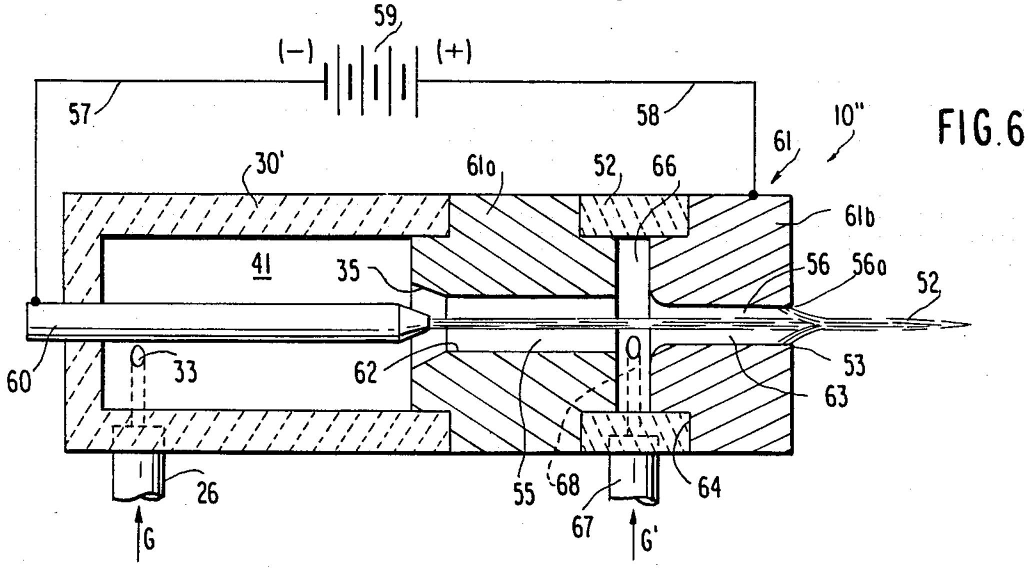

FIG. 6 is a longitudinal sectional view of an improved nontransferred plasma arc-torch having an extended arc column forming a further embodiment of the present invention.

Figure 7:
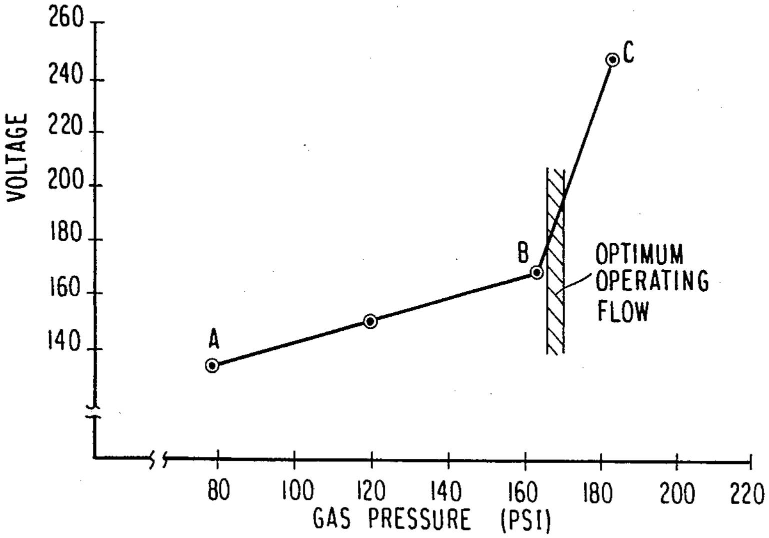

FIG. 7 is a plot of voltage versus gas pressure showing the optimum operating conditions for the extended arc column type nontransferred plasma-arc torch of FIGS. 2-6.

DESCRIPTION OF THE PREFERRED EMBODIMENTS

Referring to FIGS. *2a* and *2b*, an improved plasma spray torch indicated generally at 10 forming one embodiment of the present invention uses a cylindrical, electrically insulating body piece 30 similar to that at 10 in the prior art torch of FIG. 1. Body piece 30 is closed off at one end by a second cylindrical body piece 31, the opposite end of the body piece 10 having a transverse end wall 30*a* supporting coaxially, a cathode electrode 32. The foot 32*a* of the cathode electrode 32 projects into a conical reducing section 35 of bore 31*a* defining a torch nozzle passage 34. The invention relies on high vortex strength plasma gas flow to create an extended ionized arc column zone. In this case a gas supply pipe or tube 26 is tangentially disposed with respect to the annular chamber 41 surrounding the cathode electrode 32 with the gas flow shown by the arrow G entering chamber 41 tangentially as seen in FIG. *2b* through passage 33, and exiting through the conical reducing section 35 leading to the reduced diameter bore 31a and constituting the nozzle passage 34. As such, the conical reducing section 35 smoothly passes the vortex flow into the reduced diameter nozzle passage 34. The principle of conservation of angular momentum creates a greater vortex strength with reduction of the outer boundary diameter of the gas flow. A small diameter core of the vortex exhibits low gas pressure relative to that of the gas layers near the passage 34 wall. An extended arc column 37 results with that arc column positioned to pass through the low pressure core and well beyond the exit 34*a* on the nozzle 34.

By physical phenomena, not well understood by the Applicant, a reduction of the nozzle 34 diameter and/or an increase in arc current creates a greater than critical pressure drop in its passage through the nozzle 34 to the atmosphere to eliminate the vagaries of the arc anode spot associated with the subsonic counterpart. With the supersonic flow, the anode region becomes more diffused and spreads over the inner wall of nozzle 34 near the nozzle exit and over a thin circumferential radial region of body piece 31 surrounding the exit 34*a* of the nozzle. The extended arc 37 (ionized zone) is of reduced diameter compared to the ionized zone 19 of the prior art torch, FIG. 1. Its length, extending beyond the nozzle exit 34*a* is also significantly increased over the length of the ionized zone 19 of the device in FIG. 1. The comparison of one example of the improved torch 10 of FIGS. *2a*, *2b*, utilizing the principles of this invention in contrast to the example discussed involving the prior art apparatus of FIG. 1 helps to distinguish the important differences between the improved torch and that of the prior art. A torch 10 was operated using 120 SCFH of nitrogen under an applied voltage of 200 volts across the gap between the cathode electrode 32 and the anode 31 at a current of 400 amps. In the sample apparatus, the nozzle diameter was 3/16th of an inch and under operating parameters, the ionized zone extends 1¼ inches beyond the nozzle exit 34*a*. With the electrode losses again about 30 volts, the net gas exit enthalpy (after the 20% cooling loss) reached 27,000 Btu per pound; nearly double that of the prior art apparatus of FIG. 1. While it is difficult to calculate or otherwise determine the exit jet velocity, the jet velocities of the second example utilizing the improved plasma spray torch 10 in contrast to the FIGS. *2a*, *2b* in contrast to the prior art torch 10′ of FIG. 1 may be compared on the basis of gas enthalpies and nozzle cross-sectional areas. Under this relationship, the gas flow for the second example using torch 10 is 1.2 that of the first example using torch 10′. Applying the inverse relationship of nozzle areas, the jet velocity of the second example (for a given gas enthalpy) is 3⅓ times that of Example 1. Applying the square root of the enthalpy ratio, an additional velocity increase of 1.4 results. Thus, the jet velocity of the plasma flame jet 38 is seen as having a maximum increase of about 4½ times that of the flame jet 25 of the prior art example.

The intense heating capability of the arc torch 10 of the present invention, plus the great increase in jet velocity, yields a technological advancement in plasma spraying of significant magnitude. Keeping in mind that over the past years, in plasma spraying it was known and appreciated that dense coating requires high particle impact velocities. Additionally, however, adequate particle heating is necessary to insure molten or semi-molten condition of the material prior to impact with the substrate. Applicants' method and apparatus is fortunately characterized in that the increase gas enthalpy is capable of adequately heating the particles which, due to their higher velocities remain in the jet 38 a very short period of time prior to impact against the substrate to be coated. In essence, the present invention requires the use of a greater-than-critical pressure drop of the gas passing through the nozzle. Such a drop is visually proved by observing the presence of shock diamonds 40 within the flame jet 38 of the FIG. *2a* apparatus. Also, the ionized zone (the length of arc extending beyond the nozzle exit 34*a*) should, for best flame spraying results be at least four times that of the nozzle throat (bore 31*a*) diameter.

The illustrated apparatus of FIGS. *2a*, *2b* involved the flame spraying of powdered material as indicated by the arrow P, FIG. *2a*. The present invention is also capable of spraying material in wire and rod form to create high quality flame spray coatings. In fact, to date, practical wire use in plasma spraying has not been possible due to inefficient wire atomization by the lower velocity plasma jet such as jet 25 of the FIG. 1 apparatus.

FIGS. *3a* and *3b* illustrate two different plasma jet-to-wire geometry which may be used due to the much-extended arc regime. FIG. *3a* shows a modification of the embodiment of FIGS. *2a*, *2b* and defining yet another embodiment of the invention. A wire 50 is sandwiched between a pair of feed rolls 51 which are driven as indicated by the arrows causing the wire to be fed slowly in the direction of arrow 28 into the plasma jet 37 at a given angle $\theta_1$. It has been found that the wire 50, being placed so close to the nozzle exit 34a of the nozzle 34 within body piece 31 for torch 10″, receives a high proportion of the total arc anode heating. Very high melt-off results. For many metals, this is the preferred geometry. For others, such intense heating may lead to overheating and indeed undesirable vaporization. For example, when spraying zinc wire, a large cloud of very fine particles of white zinc oxide would be produced under the setup of FIG. *3a*. Alloys comprising critical proportions of their constituents can be badly damaged.

FIG. *3b* shows a further embodiment 10 of basically the same torch as torch 10 but of FIGS. *2a*, *2b*, but modified to the extent that particles are not fed via pipe 27 and passage 27' of that embodiment but rather, the wire or rod 50 is being fed in the direction of arrow 28 by a pair of driven feed rolls 51 which are rotated in the direction of the arrows and which sandwich the rod or wire 50 under like pressure. However, utilizing a small acute angle $\theta_2$ in contrast to the larger angle $\theta_1$ of FIG. 3*a*, FIG. 3*b* shows a more favored wire feed mode for many low-melting materials and critical alloy materials. Further, the entry point for the leading end of the wire or rod 50 is near the end of the ionized zone, i.e., the extended arc 37 and only a small amount of anode heating results. The result of using this arrangement as shown schematically in FIG. 3*b* and in contrast to the schematic representation in FIG. 3*a* is similar to hot gas heating with little superheating of the atomized molten droplets. Under these conditions zinc wire does not create a dense pall of smoke.

To increase the rate of wire spray, one may feed more than one wire to the extended ionized zone. For example, the modes shown in FIG. 3*a*, 3*b* may be used concurrently. In some cases, it is advantageous to feed three or more wires into the jet simultaneously to achieve maximum melt-off rates.

Alternatively, rather than feeding multiple wires into the ionized zone, i.e., the extended ionized arc column 37, the torch 10 as shown in FIG. 1 is modified in FIG. 4 to the extent where a strip 60 of metal or other material is fed obliquely into the extended ionized arc column 37 in the direction of the arrow, the strip 60 being moved in the same manner as FIGS. 3*a*, 3*b* by being sandwiched between a pair of positively driven rollers or wheels (not shown). Tests have confirmed that the melt-off rates are significantly greater than for a wire as in FIGS. 3*a*, 3*b*. It should be noted that due to the large voltage and current employed in the creation of the arc and the resultant heat available, the melt-off rate is vastly improved. In a series of tests run at a power level of 50 kw, the optimum strip cross-section for a stainless steel strip was 3/32 of an inch thick by ¾ of an inch wide.

The invention uses particularly high voltages with one advantages being the resulting low amperage level for a given power. At 80 kw, 400 amperes is much more reliable in its use than current at 1,000 amperes. Nozzle anode problems, in particular, are greatly reduced using the method and apparatus of the present invention. With the high velocities achieved, where the flame jet velocities are adequate for wire atomization, there is little sense in increasing the melt-off rate by further torch power increase.

FIG. 5 illustrates an embodiment of the invention utilizing the torch 10 of FIGS. 2*a*, 2*b*. Again, absent the pipe 27 passage and passage 27' and the supply of materials in powdered form as at P (FIG. 2*a*), in this case, the torch 10 fixedly supports and feeds two wires 71, 72 for passage into the extended ionized arc column 37 at two different positions along the extended ionized arc column. In addition, the output of a low voltage welding machine is imposed across the wires to be melted and spray coated onto a substrate (not shown). A DC supply 70 is shown schematically which may as stated previously constitute the output of a low voltage welding machine and is imposed across the two metal wires 71, 72 via leads 76, 77. The plasma-arc passes to the ground potential wire 72 placed further along the plasma jet. Further, an additional arc 73 is generated between the approaching ends of the two wires 71, 72 in the vicinity of the extended ionized arc column 37 and it adds its electrode losses directly to wires 71 and 72 resulting in a further increased melt-off rate. The electric circuit is such that the nozzle anode 31 and the downstream wire 72 constitutes a common ground since a conductive tube 78 functions as a guide for the downstream wire 72 and is mechanically and electrically connected to body piece 31 constituting the nozzle anode by a conductive strap or support 79. The wire 71 becomes a second cathode (to cathode electrode 32) of torch 10, FIG. 2*a* and the wire 71 must be electrically insulated from the body piece 31 in passing therethrough. In that respect, an electrically insulating guide tube 76 slidably carries wire 71 with the insulating tube 75 being fixedly positioned within a diagonal hole 80 formed within the nozzle anode body piece 31. Again, the wires are driven in the directions of the arrows adjacent thereto in a positive manner by the rotation of positively driven rolls 51 which sandwich the wires and move them axially into the ionized arc column 37. The extended ionized arc column 37, which is in this case the main arc column, provides the ionized path for energizing the electron flow from wire 71 to wire 72. As such, the arc 37 is established first, then the wire 71 and 72 are pushed into arc 37 and are physically spaced about ¼-inch apart.

A further advantage of the present invention is the capability of the apparatus for concurrently spraying both wires and powders. As such, the torch 10 may retain the pipe or tube 27 and passage 27' and at the same time utilize paired rolls as at 51 for feeding a wire 50 in FIG. 3*a* into the extended ionized arc at column 37. Thus, each type of spray mode has its own characteristics and the combination of the embodiments illustrated can produce unique results. Wire to be sprayed must produce fully molten particles or particles merely heat softened. The wire may produce better done strengths and coating density, but high temperature levels can lead to an adverse oxidation or other damage to the material.

Where extremely high power levels are required, it is necessary to use the geometry of the embodiment as shown in FIG. 6. The reason for the more complex geometry may be best seen from viewing the first embodiment of FIGS. 2*a*, 2*b*. To obtain higher power, either the current or voltage of the arc must be increased. When the current is increased, the anode attachment point moves back into the nozzle passage 34, axially reducing the voltage. Increased voltage may be obtained increasing the gas flow. However, gas pressure within the torch 10 may lead to a rapid failure of the cathode 32 in that embodiment.

In the embodiment of FIG. 6, the improved plasma spray torch 10" of this embodiments operates in the same manner as the torch 10 of FIGS. 2*a*, 2*b*. A cup-shaped, cylindrical electrically insulating body piece 30 coaxially supports a cathode electrode 60 in the same manner as the first embodiment of the invention in that body piece 10 is closed off by a second body piece 61 constituting the anode electrode for the torch 10". In FIG. 6, the cathode 60 connects to the DC power supply 59 by lead 57 while line 58 leads to the second body piece 61. Incidentally, the embodiment of FIG. 6 illustrates the manner in which the potential difference is set up between the cathode anode of all of the torches including that of the prior art of FIG. 1. Further, similar to the embodiment of FIGS. 2*a*, 2*b* a primary gas G flows from tube 26 through a tangentially disposed passage 33 into annular chamber 41 aligned between the cathode electrode 60 and the inner wall of insulating body piece 30. The conical reducing section 35 again smoothly passes the vortex flow of gas into the reduced diameter nozzle of passage 55 at the upstream end of the second body piece 61 acting as the anode electrode for the torch 10". Second body piece 61 is composed of two axially separated conductive components, an upstream component 61a and a downstream component 61b. Annular grooves are formed within the periphery of the second body piece 61 at 64 which receives a short length ring 52 of electrically insulative material similar to that forming the first body piece 30 of the plasma spray torch 10". The ring 52 electrically insulates section 61a of the second body piece 61 from that of 61b. In a technical sense, therefore, the lead 58 connects from the battery, on its positive side, to the downstream component 61b of the second body piece 61. The conical reducing section 35 leads to an axial bore 62 which forms a first, upstream nozzle passage 55 with component 61a of the body piece 61 defining a first nozzle. The second component 61b of the body piece 61 forms a first nozzle and provided with a somewhat smaller diameter bore 63 forming a second nozzle passage 56 and the upstream end of the second nozzle passage 56 is flared outwardly to form a conical reducing section 65 for the gas flow passage. Thus, the downstream section 61b of the second body piece 61 forms a second nozzle axially spaced from the first upstream nozzle 61a. The anode area 53 of this torch is adjacent to the exit 56a of passage 56 with the extended ionized arc column 52 into the atmosphere being of length equal to many nozzle passage diameters. The first nozzle 61a is electrically "floating" and acts simply to increase the arc voltage by lengthening the ionized arc column 52. In most cases, the bore 62 of the first nozzle component is of a larger diameter than bore 63 defining respectively the first and second nozzle passages 55, 56.

It is important to note, that the apparatus and method employs a secondary gas indicated by arrow G' which is fed to the cylindrical chamber 66 as defined by the axially spaced wall of the upstream and downstream nozzle 61a, 61b and the electrically insulating ring 52 which couples and spaces these two nozzles from each other. The secondary gas is supplied via tube 67 which feeds to a small diameter tangential passage 68 which opens tangentially into the secondary gas chamber 66. The secondary gas G' and primary gas G may constitute the same gas simply supplied at two separate points within the apparatus with both gases exiting with and supporting the extended ionized arc column 52. Particles may be fed into the plasma gas stream upstream or at the extended ionized arc column 52 in the manner of the prior embodiment.

For a given arc nozzle length and diameter, it is relatively simple to determine the optimum gas flow. This flow is the one which, by experimentation, is seen as extending the ionized arc columns 37 well beyond the nozzle exit, yet maintains the majority of the anode arc regime just within the nozzle bore (as shown at 18a, in the embodiment of FIG. 3*b*). Too large a proportion of anode action on the open face of second body piece 61 beyond the nozzle exit results in rapid wear. Some anode action immediately surrounding the nozzle exit indicates optimum performance.

The way to determine optimum gas flow is to measure the arc voltage change with respect to the gas pressure. The plot of FIG. 7 illustrates a typical case for the downstream nozzle 61b having a nozzle bore 63 of 3/16th inch diameter. The curve represents the increase in voltage with gas pressure, the latter being a measure of gas flow. In the example illustrated by the plot, FIG. 7, the gas employed was nitrogen. The voltage rises steadily and evenly between points A, B of the curve. Beyond B a small increase of flow causes a rapid increase of voltage, i.e., between points B, C of the curve. Under conditions beyond point B, the arc anode begins to exit the nozzle bore 63. Near point B, most of the anode actim is still within the nozzle bore. Optimum conditions arise in the area of the cross-hatching in the plot of FIG. 7 with gas pressure on the order of 165 to 170 psi.

This simple indicator of optimum performance is a strong design tool. For example, the powder supply (a silicon rectifier) has a maximum operating voltage of 200 volts. The maximum rated current is 400 amperes. The maximum 100% duty cycle power output is 80 kw. To operate under these maximum conditions, and yet to maximize nozzle life while creating a supersonic exit jet velocity represents a difficult task. First a reasonable nozzle diameter and length are selected. In one case, the diameter selected was 5/32 of an inch with a nozzle length of 1 inch. As the nitrogen flow increased, the arc voltage increased at a decreasing rate, reaching a maximum of 160 volts. The anode spot could not be faced beyond the nozzle exit. One choice available would be to decrease the nozzle length. The other, keeping one constant, is to increase the nozzle diameter slightly. The latter change was selected and the results graphically plotted in FIG. 7.

While the invention has been shown and described in detail with reference to preferred embodiment thereof, it will be understood to those skilled in the art to which this invention pertains that various changes in form and detail may be made therein without departing from the spirit and scope of the invention.

What is claimed is:

1. In a plasma arc spray process comprising the steps of:

feeding a plasma producing gas under pressure through a chamber housing a first cathode electrode and from said chamber through a spray nozzle forming a second anode electrode and defining an anode nozzle passage aligned with said first electrode and being spaced therefrom, while creating an electric arc between said first and second electrodes to set up a plasma flame jet exiting said nozzle passage, and feeding material into said flame jet for melting said material and accelerating the same within said flame jet for coating a substrate by impingement placed in front of and downstream of the nozzle exit, the improvement comprising the steps of:

establishing a vortex flow of plasma-producing gas to create a low pressure core of gas flow extending through the anode passage with said low pressure core, establishing an extended ionized arc column throughout the anode nozzle passage, and adjusting the rate of gas flow and the arc current to the anode nozzle passage diameter to produce a supersonic extended ionized arc column which extends beyond the end of the nozzle by a distance which is approximately four times the nozzle passage diameter.

2. The method as claimed in claim 1 further comprising the step of introducing the material to be sprayed at a point along the extended ionized arc column beyond the end of the nozzle to maximize the spray rate without undesirably overheating the spray material.

3. The method as claimed in claim 1 wherein said step of introducing the material to be sprayed to the extended ionized arc column comprises feeding at least one wire formed of such material obliquely into the extended ionized arc column in the direction of gas flow for atomization and spraying.

4. The method as claimed in claim 3 further comprising the step of feeding at least one separate flow of material in powder form concurrently into the gas flow through said anode nozzle passage.

5. The method as claimed in claim 3 wherein the step of feeding of at least one wire of a material to be flame sprayed comprises feeding two wires obliquely into the extended ionized arc column downstream of said anode nozzle passage, wherein said wires are formed of an electrically conductive material and wherein said method further comprises a step of subjecting said two wires to an electrical potential difference to set up a secondary arc column between the ends of the wire fed into the extended ionized arc column with said secondary arc constrained to flow concurrently with the extended ionized arc column issuing from the plasma torch anode nozzle passage.

6. The method as claimed in claim 4 further comprising the steps of precoating the particles of said powder with a thin layer of a wettable material prior to contact with said extended ionized arc column and subsequently heating said precoated powder particles to only the extent required to cause the particles to adhere to molten droplets formed from the materials making up said wire.

7. A method for flame spraying unstable powdered material, said method consisting of the steps of forming a plasma arc spray jet, applying a thin coating of a wettable material on particles of said unstable powdered material, feeding said coated particles to said plasma arc spray flame jet and heating said particles in said flame jet to only that temperature sufficient to effect adherence to other particles, and feeding separately further particles of material similar to or the same as said coated particle material to the plasma arc spray flame jet to heat soften or melt said further particles of material so as to effect adherence thereof to said coated flame spray particles.

8. The method as claimed in claim 7 wherein said further consist of diamond bort coated with a nickel-containing material.

9. The method as claimed in claim 7 wherein said inherently thermal unstable material is silicon carbide.

10. The method as claimed in claim 7 wherein said unstable powdered material is fed into a plasma arc spray flame jet as a core of a continuously fed metal sheet fed into the plasma arc spray jet obliquely to the direction of spraying and intersecting that jet with the sheet coplanar to the axis of said plasma arc spray flame jet.

* * * * *